(No Model.)

G. W. TEGG.
NUT LOCK.

No. 293,113.  Patented Feb. 5, 1884.

Witnesses:
H. M. Wells
Rich'd A. Goldsbrough

Inventor,
George W. Tegg,
per A. B. Upham,
His Attorney.

UNITED STATES PATENT OFFICE.

GEORGE WILLIAM TEGG, OF PEORIA, ILLINOIS.

NUT-LOCK.

SPECIFICATION forming part of Letters Patent No. 293,113, dated February 5, 1884.

Application filed October 11, 1883. (No model.)

*To all whom it may concern:*

Be it known that I, GEORGE W. TEGG, of Peoria, in the county of Peoria and State of Illinois, have invented an Improved Nut-Lock; and I do hereby declare that the following is a full, clear, and exact description thereof, reference being had to the annexed drawings, making a part of this specification, in which like letters of reference refer to like parts, and in which—

Figure 1:
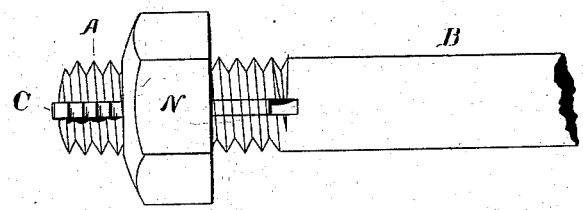
Figure 2:
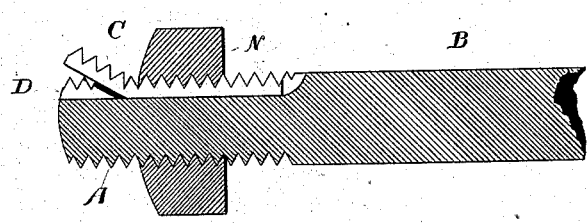
Figure 3:
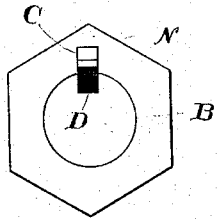

Figure 1 represents a side view; Fig. 2, a longitudinal section; Fig. 3, an end view.

The object of this invention is the construction of a nut-lock that shall effect the non-turning of a nut upon its bolt by a device connecting more or less rigidly together the nut and bolt. A groove is formed longitudinally along a bolt as far as its threads extend, and a metal key fitted therein whose outer face is notched to correspond with the threads of the bolt. After a nut has been screwed onto this bolt upon the notched key, the free end of said key is bent away from the bolt, and the nut is thereby kept from turning off from the bolt.

In the drawings, N represents the nut; B, the bolt, and C the notched key. Said key C can be formed by fastening it in the groove D of a blank bolt and then turning the thread upon the bolt and it at the same time; or the notches in the key can be made by stamping, cutting, or filing. Although I have shown this device applied to an ordinary nut, it is equally applicable to a thumb-screw or thumb-nut. The key C is made of spring metal, so that the nut can be turned back and forth over the bend in the key C without breaking it, the elasticity of said key being sufficient to prevent the unscrewing of the nut except upon the application of some little force.

Fig. 2 shows the key C as bent sufficiently to prevent the nut N from being easily removed from its bolt B. In case there is great pressure and constant jarring against the nut N, I usually drive a small nail or other thin wedge into the groove D between the key and the bolt. This makes the nut perfectly secure from turning off until after said nail or small wedge has been removed.

What I claim as my invention, and for which I desire Letters Patent, is as follows, to wit:

The bolt B, having groove D longitudinally therein through its threads, in combination with a nut, N, thereon, and the spring-metal key C, notched to correspond with said threads and having its outer end bent away from its containing-groove D, substantially as and for the purpose specified.

In testimony that I claim the foregoing invention I have hereunto set my hand this 5th day of October, 1883.

GEORGE WILLIAM TEGG.

Witnesses:
A. B. UPHAM,
JUDSON STARR.